United States Patent [19]
Snead et al.

[11] 3,729,262
[45] Apr. 24, 1973

[54] OPTICAL LENS DOCKING SYSTEM

[75] Inventors: Edwin E. Snead, Yeadon, Pa.; Jay B. Pitkow, West Chester, Pa.

[73] Assignee: Burroughs Corporation, Detroit, Mich.

[22] Filed: July 20, 1971

[21] Appl. No.: 164,350

[52] U.S. Cl. ............... 356/153, 356/154, 244/114, 114/43.5, 340/26
[51] Int. Cl. ............................................. G01b 11/26
[58] Field of Search ......................... 356/153, 154; 244/114; 114/43.5; 340/26

[56] References Cited

UNITED STATES PATENTS 2,991,743  7/1961  Ogle .................................. 114/43.5
3,279,406  10/1966  Ricketts et al .................. 114/43.5

Primary Examiner—Ronald L. Wibert
Assistant Examiner—Paul K. Godwin
Attorney—Edward J. Feeney, Jr.

[57] ABSTRACT

A system is described which provides a visual display for the accurate guidance and docking of aircraft after landing. The display is also suitable for the visual alignment and guidance of other vehicles to a desired parking position. The system employs a combination of lenses and light sources arranged to create for the observer, information for center line steering, closing rate and stopping. In terms of aircraft docking, such information permits the pilot to dock his aircraft without the assistance of ground personnel.

20 Claims, 15 Drawing Figures

(a) PILOT VIEWS TURN-IN INDICATION
(b) PILOT TURNS AND PROCEEDS TOWARD GATE
(c) ALIGNS LOWER VERTICAL BAR WITH UPPER DATUM BAR. HORIZONTAL STOP BAR COMES INTO VIEW.

(d) MAINTAIN ₵ ALIGNMENT. HORIZONTAL BAR MOVES UP TOWARD 747.
(e) PROCEEDING TO STOP HORIZONTAL BAR MOVING UPWARD.
(f) STOP! PERFECT ALIGNMENT.

INVENTORS.
EDWIN E. SNEAD
JAY B. PITKOW
BY Francis A. Varallo
AGENT

Patented April 24, 1973　　3,729,262

Patented April 24, 1973  3,729,262

OPTICAL LENS DOCKING SYSTEM

CROSS REFERENCE TO RELATED APPLICATION

The docking system of the present invention is related to the optical display device described and claimed in application Ser. No. 674,228 which issued as U. S. Pat. No. 2,991,743, "Optical Device for Image Display," by James A. Ogle. This patent is assigned to the same assignee as the present application.

BACKGROUND OF THE INVENTION

In the reference patent an optical device is described for displaying the image of reference objects to an observer. More specifically, the device is employed as an optical glide path indicator for visually indicating to a pilot the proper glide angle for the safe landing of an aircraft on an area of restricted size. Such an area might be the flight deck of an aircraft carrier.

In connection with the optical system of the reference patent, an assembly is provided comprising a plurality of cells, each cell having reference lamps and lenses so disposed with respect to one another that an image of the reference lamps is produced. In terms of aircraft landing, the image of the lamps seen by the pilot is a horizontal bar of light which appears to move up or down depending upon the aircraft's angle of approach. Associated with the assembly but external thereto are fixed rows of lights which establish a datum line. The correct glide angle is indicated by the visual alignment of the bar of light with the datum line. Having made the necessary adjustments in his angle of descent, the pilot is required only to achieve the proper touch-down point for a safe landing.

In the last few years, the docking of aircraft at airport terminals has become an increasingly complex and hazardous part of airline ramp activity. It had been the practice to utilize the services of ground signalmen to assist the pilot in positioning and stopping the aircraft at a desired location. However, the size of today's aircraft such as the 747's, L-1011's, DC-10's coupled with the crowded and confined space of the terminals approaches or exceeds the capability limit of ground signalmen to consistently and accurately position a moving aircraft at a specific angle and stopping point under all environmental conditions. The optical lens docking system of the present invention by expanding upon the optical techniques taught in the reference patent, provides the pilot with all the information he requires to dock his aircraft safely without ground signalmen. Additionally, the system functions equally well under various conditions such as day and night operation, in snow and rain, bright sunlight and fog.

SUMMARY OF THE INVENTION

In accordance with the present invention there is provided a device capable of concurrently displaying interrelated information required by the observer for properly docking or parking an aircraft or other vehicle. The device comprises a plurality of lenses including Fresnel's and lenticulars and a light source arranged to create information for center line steering, closing rate and stopping. A high intensity light source is positioned a predetermined distance from the lenses so that the image of the light source as seen through the lenses appears to move when viewed from the moving vehicle or aircraft. A vertical line or bar of light created within the display itself serves as a datum or reference line and horizontal displacement of a second vertical line with respect to the datum line indicates to the pilot that his aircraft is positioned to the left or right of the desired alignment. Concurrently the pilot sees a horizontal line or bar of light appear to move in a vertical direction toward a designated stopping point. The speed with which this "stop bar" appears to move provides an indication of the closing rate. The actual stopping point varies in accordance with the type of aircraft being docked. The present device includes an alpha-numeric display and associated stop cues representing the various types of aircraft or vehicles being parked. Alignment of the horizontal stop bar with the appropriate stop cue (while maintaining center line alignment as described hereinbefore) indicates a precisely repeatable stop point.

With specific reference to aircraft docking, the present system may be used with all existing aircraft and will accommodate the proposed large-scale subsonic and supersonic aircraft for either "straight in" or "angled" docking schemes. Besides providing information for roll-in steering, closing rates and stopping, the display may also be utilized to provide the initial turn-in point.

It is therefore a primary purpose of the present invention to provide an accurate docking system for aircraft and other vehicles. Concomitant advantages of the system include the reduction of the probability of ground accidents, the elimination of ramp point marking, the reduction of wing-type clearance requirements and the desirability of requiring no on-board equipment.

Other features of the invention will become more fully apparent in the detailed description of the display device and its mode of operation which follow.

DESCRIPTION OF THE PREFERRED EMBODIMENT

Figure 1:
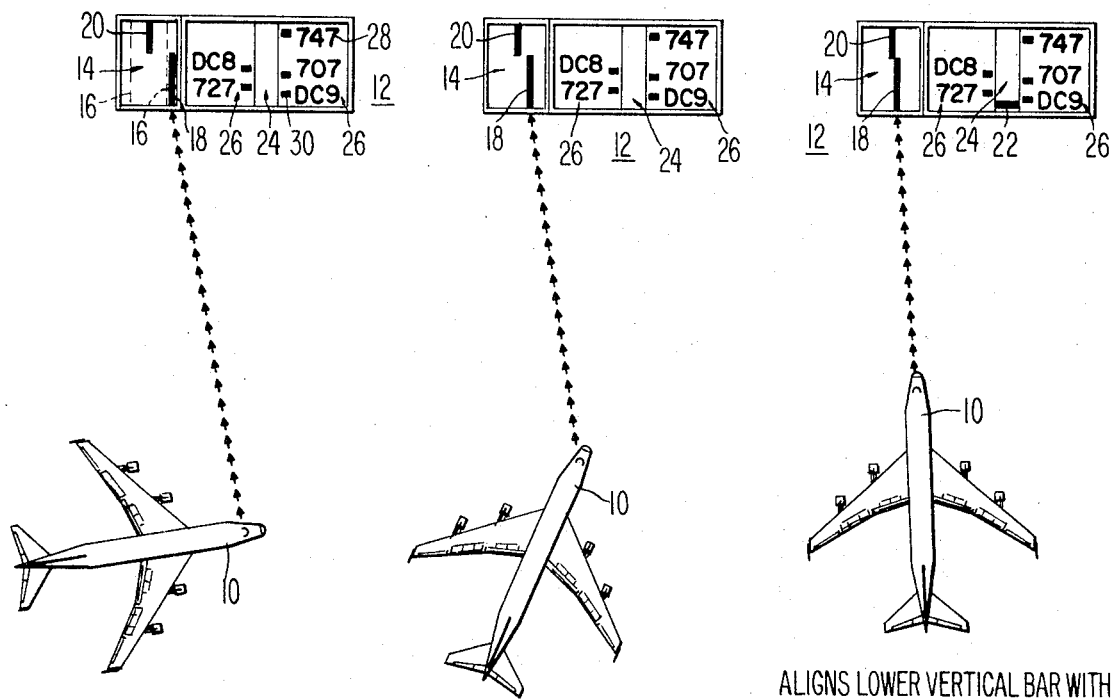
FIGS. 1a – 1f inclusive illustrates the sequence of events in docking an aircraft utilizing the present invention.
Figure 1:
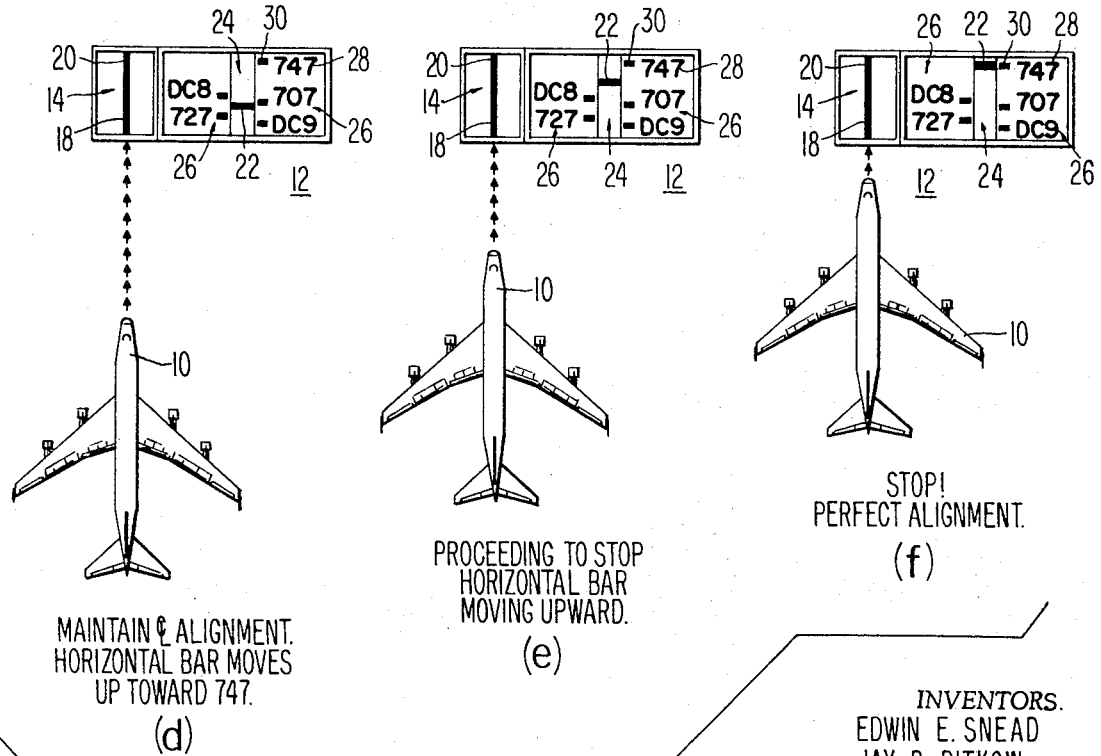

FIG. 1a – 1f inclusive illustrates the sequence of events in docking an aircraft 10. The optional "turn-in point" feature mentioned hereinbefore is assumed to be incorporated in the display docking device 12.

Assume that after landing, the pilot approaches the gate center line from the left as indicated in FIG. 1a and at approximately right angles to the docking device. The center line module 14 of the device includes at each of its horizontal extremities a narrow, bank-like, colored filter 16, positioned as indicated by the dashed lines. The center line bar 18 seen through these filter is of a highly visible color which contrasts with that of the bar as it appears in the remainder of the module. In an actual operating system and with reference to FIG. 1a when the pilot is within approximately 6.5 degrees of the gate center line, he first observes the center line bar 18 through the colored filter at the left edge of the module. As he proceeds in the same direction, the bar assumes it normal color and moves through its aligned position with the upper datum bar. Thereafter the center line bar again "changes" color as it enters the filter area at the opposite right extremity of the module. This is the precise point in the docking procedure depicted in FIG. 1a. This last indication signals the pilot to initiate a turn toward the gate. Taking into account such considerations as the physical location of the pilot in the cockpit, and the nose wheel turning radius of the aircraft, the initiation of a turn at this time will bring the aircraft into near perfect alignment with the gate center line. This "turn-in point" feature is especially useful in docking large aircraft on ramp areas in which the distance of the taxiing aircraft from the gate is limited. Under these conditions, and in the absence of such turn-in point information, the pilot will not have sufficient distance to realign his aircraft should his initial turn-in maneuver be unsatisfactory.

FIG. 1b illustrates the continuation of the turn toward the gate. The center line bar 18 has moved from the right extremity of the module toward the datum bar 20. Upon completion of the turn, in FIG. 1c, the aircraft is just slightly to the right of the gate center line. It should be noted that the position of bar 18 to the right or left of the datum line 20 indicates respectively a like attitude in the alignment of the aircraft with respect to the gate center line.

In FIGS. 1c and 1d as the aircraft proceeds toward the gate, the pilot brings the lower vertical bar into alignment with the upper bar and maintains this alignment. As the aircraft proceeds further toward the desired position, the pilot will begin to observe a horizontal bar 22 appearing in the stop bar module 24, as depicted in FIG. 1c. The horizontal stop bar will move up from the bottom of the display as indicated in FIG. 1c and 1f inclusive if the docking system is below the eye of the pilot, and down from the display if the system is above the eye level of the pilot. It has been found for example that the display unit may be mounted either above or below the level of the pilot's eyes for docking the 747 type aircraft.

On either side of the horizontal stop bar are back-lighted masks 26 having alpha-numeric designations 28 for the particular aircraft utilizing the gate. Alongside each aircraft designation is an accurately positioned stop cue 30. The pilot will align the horizontal bar with the stop cue for his particular aircraft. In FIG. 1, it is assumed that the aircraft depicted is of the 747 type. Therefore, as shown in FIG. 1f, when the pilot has maintained the alignment of the two vertical bars 18 and 20 so that they appear as one bar, and when the horizontal stop bar 22 has been aligned with the stop cue for the 747, the aircraft has been properly docked.

Figure 2:
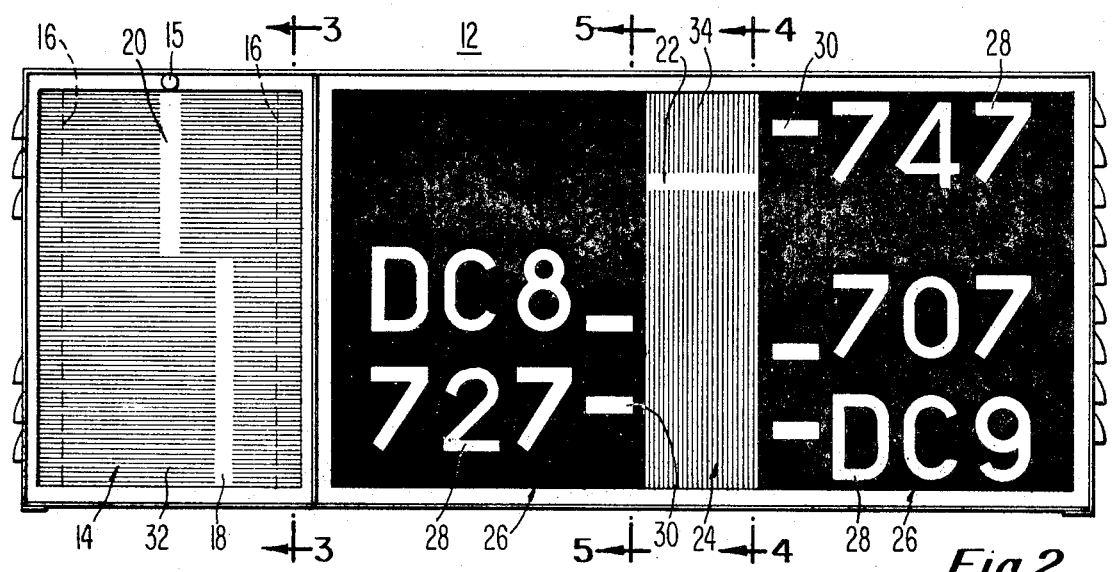
FIG. 2 is a front view of the display device as seen by the observer.

FIG. 2 is a pictorial representation of the optical docking device 12 illustrating the center line module 14 and the stop bar module 24, the latter having on both sides thereof (or on one side only if adequate for the particular application) back-lighted masks 26. The masks have alpha-numeric designations 28 corresponding to the different types of aircraft to be docked. Rectangular symbols positioned adjacent the alpha-numeric designations serve as stop cues 30.

The external surface of the center line module 14 and the stop bar module 24 are made up respectively of the horizontal ribbed lenticulars 32 and the vertically ribbed lenticulars 34. The pair of colored filters 16 used for turn-in point information are situated behind the lenticulars 32 as indicated by the dashed lines.

A photocell 15 is located on the front surface of the display 12. As will be described in greater detail hereinafter, the photocell actuates the circuit controlling the voltage to the lamps in the display, so that the light intensity is increased if the ambient light is high, and decreased for low ambient conditions. This has the effect of providing the proper contrast ratio at all times for optimum visibility.

In actual operation, the display unit 12 is installed on the terminal building at a height to accommodate the particular types of aircraft to be docked. The center line module 14 of the unit is positioned a predetermined distance to the left of the gate center line. This distance is chosen to coincide with the distance the pilot is displaced from the center of the aircraft, and may be of the order of 21 inches. As will be considered in greater detail hereinafter, the display unit 12 is mounted at a height such that an angle exists between the pilot's eye and the display. In an actual operative embodiment, this angle of view may vary from approximately 5° to 15°, with 10° considered to be optimum.

Figure 3:
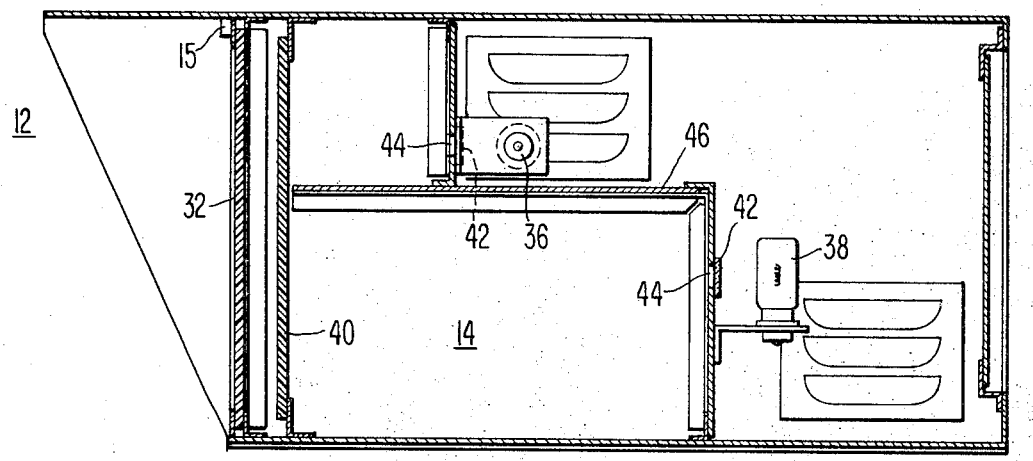
FIG. 3 is a section view of the device taken along the line 3—3 of FIG. 2.
Figure 4:
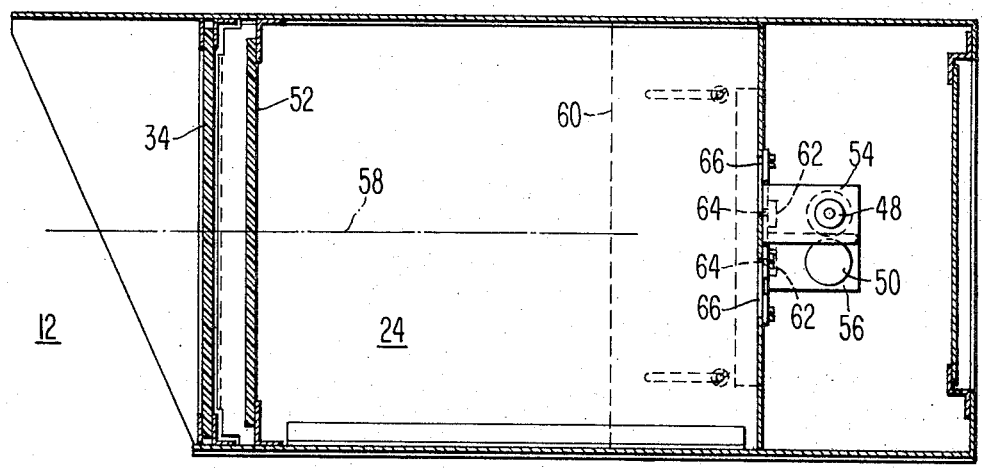
FIG. 4 is a section view of the device taken along line 4—4 of FIG. 2.
Figure 5:
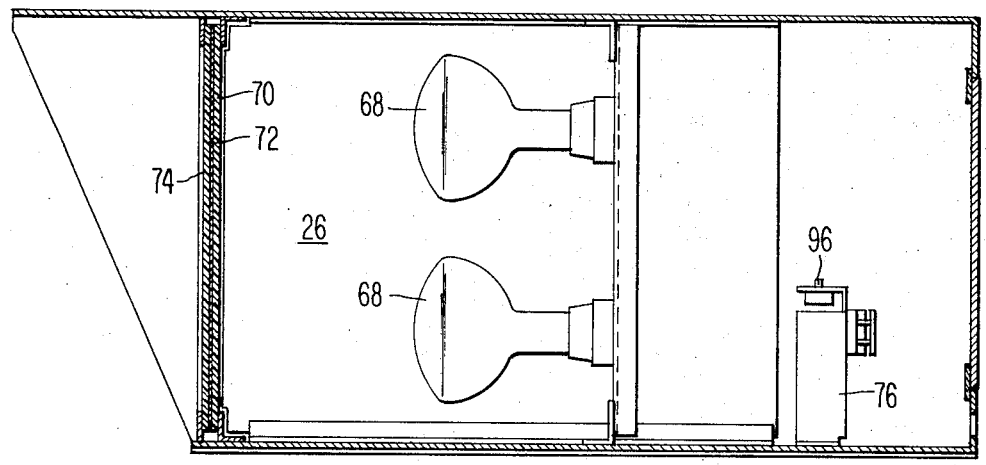
FIG. 5 is a section view of the device taken along the line 5—5 of FIG. 2.
Figure 6:
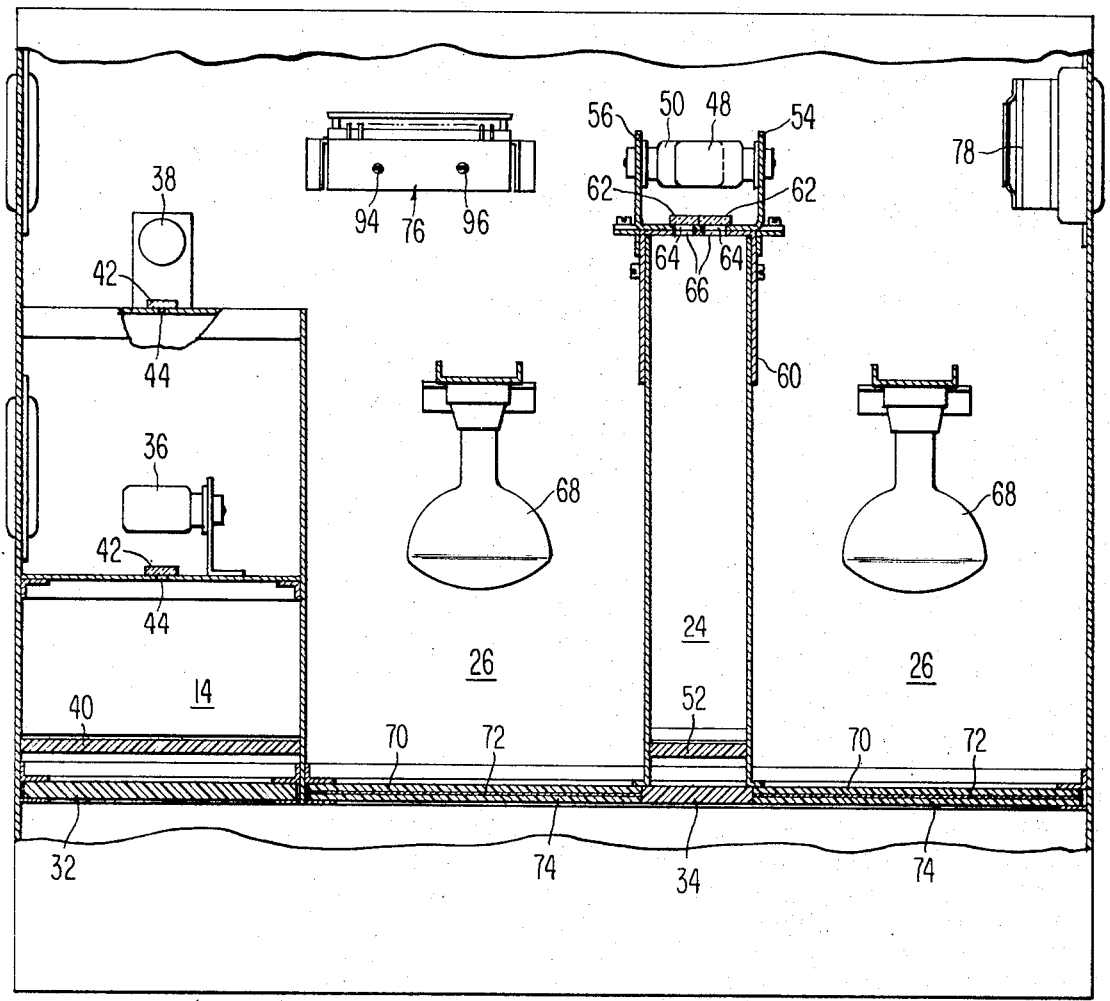
FIG. 6 is a plan view of the display device with portions cut away.

FIGS. 3, 4 and 5 are section views of the unit taken respectively along lines 3—3, 4—4 and 5—5 in FIG. 2. Thus, FIG. 3 is a view taken through the center line module 14; FIG. 4 through the stop bar module 24; and FIG. 5, through one of the mask sections 26 adjacent the stop bar module. FIG. 6 is a plan view of the display unit 12 with some portions cut away. Like reference characters have been used throughout the drawing to identify like components.

With continued reference to FIG. 2 and specific reference to FIGS. 3 and 6, there are shown two projection type lamps 36 and 38 which serve as light sources, and a lens system comprising a Fresnel lens 40 and a cylindrically ribbed lenticular 32. It should be understood that other combinations of lenses, the character of which are well-known to the optical designer, may also be satisfactorily employed. Therefore, although the present invention is not to be considered limited to the use of a Fresnel lens and lenticular spreaders as described herein, such a combination has proved highly successful.

The lamp 36 provides the datum line 20; lamp 38, the center line bar 18. As a space-saving design convenience, the longitudinal axis of the datum lamp 36 is mounted in a horizontal plane, although its filament is vertical, that is, at right angles to the axis. Lamp 38 is of a different construction — its filament is vertical, that is, parallel with the longitudinal axis of its envelope. The ground glass inserts 42 are illuminated by the lamps 36 and 38 and serve as the objectives for the lens system. The slots 44, (both the glass inserts 42 and the slots 44 being more easily observed in FIG. 6) permit the Fresnel lens 40 to image the light on the ground glass inserts at a predetermined distance behind the lens. The light baffle 46 within the module 14 segregates the images of the lamp filaments.

The ground glass inserts 42 have a diffused surface facing the Fresnel lens and a polished surface on the side adjacent the light source. The glass is of a type which will withstand the high temperatures of the projection lamps and has a spectral color of 5,500 Angstroms, a high visibility color, sometimes referred to as "aviation yellow." Thus the light bars generated within the docking unit are of this easily discernible yellow color. The slots 44 serve to diminish the scattering of light within the module.

It is apparent from FIG. 3 that the datum lamp 36 is positioned much closer to the Fresnel lens 40 than lamp 38. The sensitivity of the display as experienced by the observer varies directly with a change in the distance behind the lens at which the visual image of the light source appears. Thus, the sensitivity of the datum line display is by the aforementioned positioning so diminished, that the observer is unaware of any horizontal movement of the datum line as he moves to align the lower bar 18 therewith. The sensitivity of the lower moving bar 18 is chosen to be adequate for particular applications. Increasing the distance of lamp 38 from the Fresnel lens 40 increases the sensitivity of the display, that is, the rate of apparent movement of the light bar 18. At the same time, however, the increase in sensitivity is accompanied by a decrease in the horizontal audience angle through which the display is visible. An audience angle of 6.5° on either side of the gate center line has been found to be suitable for most applications.

The lenticular spreaders 32 as employed in the center line module 14 and positioned in front of the Fresnel lens 40, are made up of clear, colorless, cylindrically ribbed pieces in which the axes of the ribs are mounted horizontally. The action of the cylindrically ribbed lenticular is well-known in the art and can most simply be considered as that of a sequence of prism angles with sufficiently frequent repetition so that they appear to an observer to be continuously adjacent. This sequence of prism angles causes a vertical spreading of the rays emerging from the Fresnel lens 40 and allows the vertical images of lamps 36 and 38 to lose discrimination in the vertical plane. The lenticular spreaders also scatter reflected light such as that resulting from the sun's rays, thereby reducing the apparent intensity of the reflection to a tolerable level.

FIg. 4 is a section view providing more details of the stop bar module 24. Considering FIG. 4, along with FIGS. 2 and 6, there are depicted a pair of projection type lamps 48 and 50, each having its filament oriented along the longitudinal axis of the lamp. A lens assembly comprising a Fresnel lens 52 and a cylindrically ribbed lenticular 34, in which the axes of the ribs are vertical is shown. The lenticulars 34 cause a horizontal spreading of the rays emerging from the Fresnel lens 52.

Figure 7:
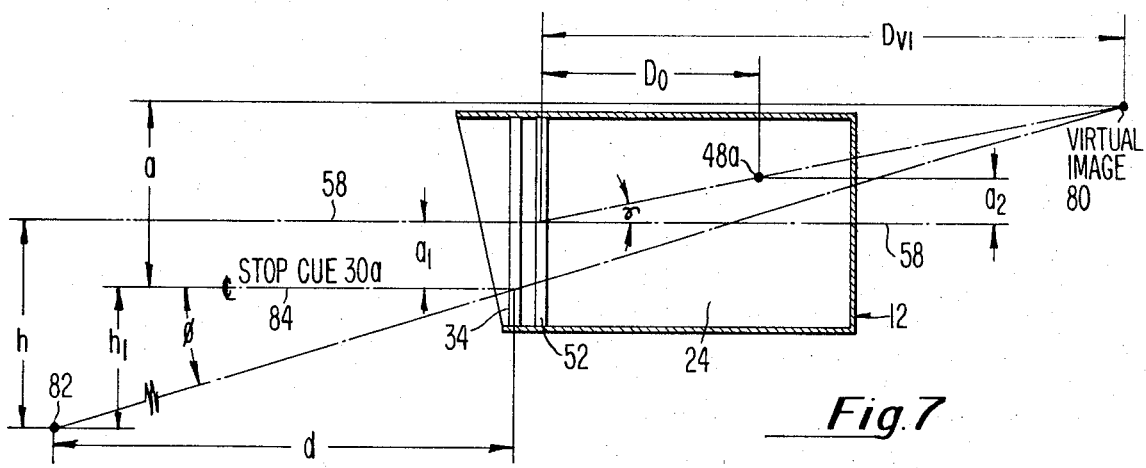
FIG. 7 is an optical schematic depicting the angular relationship between the eye of the observer and the stop bar when the latter is aligned with the appropriate stop cue.

For reasons which will become more fully apparent hereafter from a consideration of the optical schematic of FIG. 7, each of the lamps 48 and 50 are mounted respectively on brackets 54 and 56 designed to be individually moveable in a vertical plane. If the display 12 is mounted above the level of the observer's eyes, or stated another way, if the vehicle being parked is below the optical axis 58 of the Fresnel lens 52, lamp 48 will provide the desired stop bar image. On the other hand, if the display 12 is below the observer's eyes because the vehicle being parked is above the optical axis 58, the image of lamp 50 will be seen. In the preparation for operation of the device, the desired lamp to be seen by the observer is moved in a vertical plane (the horizontal distance from the Fresnel lens remaining the same) with respect to the optical axis 58 of the Fresnel lens 52. The lamp is positioned a specific distance off the optical axis of the Fresnel lens and at a predetermined distance from the lens such that when the image of the lamp is viewed by the observer at a prescribed distance from the front of the display unit 12, the horizontal bar created by the stop bar module 24 will be aligned alongside the stop cue 30 associated with the particular vehicle being parked.

As mentioned hereinbefore, the sensitivity of the display increases with increasing distance between the image source and the Fresnel lens. In the stop bar module 24, provision is made not only to move the lamps 48 and 50 in a vertical plane, but also by means of a telescoping U-shaped bracket 60, to vary the horizontal distance from the lamps to the Fresnel lens 52. Thus the sensitivity may be varied for the particular application. Increasing the sensitivity, allows the observer to view a faster moving stop bar and allows for more accurate alignment of the bar with the stop cue. On the other hand, the vertical audience through which the display is visible decreases with increasing sensitivity. Assuming that the required sensitivity has been obtained, the rate of movement of the bar as the aircraft approaches its stop point provides the pilot with a measure of the closing rate.

Ground glass sections 62 of the same type employed in the center line module 14 are also used in the stop bar module 24. These are mounted respectively on the brackets 54 and 56 over the narrow rectangular slots 64. FIG. 6 illustrates the arrangement. The portion of the U-shaped member 60, adjacent the moveable brackets 54 and 56 also contains elongated slots 66, to allow for light passage to the Fresnel lens 52 regardless of the position of lamp 48 or 50 with respect to the Fresnel lens optical axis 58.

FIG. 5 illustrates one of the alpha-numeric mask sections 26 of the display. The lighting and mask areas of the other section (if utilized) are identical in construction. A pair of floodlights in each of the sections 26 (FIG. 6) provide the required illumination. Although incandescent lamps are depicted, fluorescent lighting could also be employed if desired. The alpha-numeric mask assembly may be laminated or a solid plastic sheet. As seen in FIGS. 5 and 6, the laminated assembly comprises a plastic sheet 70 closest to the lamps, the alpha-numeric mask itself 72, and as an external covering, a matte-finish acrylic sheet 74, to minimize solar reflection. The electronic assembly 76 responsive to the photocell 15 (FIG. 1) controls the light intensity of the center line and stop bar module light sources for varying ambient light conditions. A fan 78 provides cooling.

FIG. 7 illustrates certain optical relationships present in the stop bar module 24. With additional reference to FIGS. 3, a Fresnel lens 52 is depicted having an optical axis 58. A light source 48a which is equivalent to that appearing on the ground glass 42 associated with lamp 48 (FIG. 4) is shown producing in combination with Fresnel lens 52, a virtual image 80 of the light source.

It has been mentioned hereinbefore that the display unit 12 is mounted at a height such that an angle exists between the observer's eye represented by reference numeral 82 in FIG. 7 and the display. It was noted that this viewing angle may vary from 5° to 15°, with 10° being optimum.

In FIG. 7, the observer's eye 82 is indicated as being below the optical axis 58 of the Fresnel lens 52. The observer sees the virtual image 80 of the light source 48a. The light source derived from the lower lamp 50 is not shown in FIG. 7 since its image will not be visible to the observer under these conditions.

If the observer's eye 82 had been above the optical axis 58, the image of lamp 50 and not that of lamp 48 would have been visible. The center line of the lowest stop cue 30a is designated by reference numeral 84.

In order to compute the viewing angle "$\phi$" created by the observer viewing stop cue 30a at the correct stop point, the horizontal distance "d" between the observer's eye 82 and the display unit 12, as well as the vertical distance "h," between the observer's eye and the center line of stop cue 30a must be known. Assuming that the observer wishes to stop a vehicle at a point at which "d" = 50 feet, and that the center line of the stop cue for that particular vehicle is positioned approximately 9 feet above his eye, that is, "$h_1$" = 9 feet, then:

$$\tan \phi = h_1/d = 9 \text{ feet}/50 \text{ feet}$$

$$= 0.1800$$

$$\text{and } \phi \cong 10.2°$$

In the descriptions of FIGS. 3 and 6, it was observed that the lamps 48 and 50 were individually moveable on a vertical plane with respect to the optical axis of the Fresnel lens 52. It was also noted that the lamps could collectively be positioned at various distances from the Fresnel lens 52.

In a practical alignment procedure for the stop bar module 24, after the display unit 12 has been mounted at the terminal, the vertical distance "$a_2$" measured from the Fresnel optical axis 58 to the light source 48a is determined by positioning the actual aircraft corresponding to the alpha-numeric designation adjacent stop cue 30a at a designated stop point and adjusting the distance "$a_2$" until the stop bar image 22 is accurately aligned with the stop cue 30a. In general, the particular conditions such as observer distance from the display, height of the observer's eye to the appropriate stop cue which result in the steepest (largest) viewing angle are chosen for the setting of the lamp position with respect to the Fresnel lens axis 58. In the situation depicted in FIG. 7 where the observer is below the display device, the lowest stop cue 30a would be utilized in setting the lamp to its proper vertical position. The horizontal distance of the lamp 48 from the Fresnel lens 52 will determine the sensitivity of the display as noted hereinbefore. It has been found in actual operating systems, that the sensitivity should be related to the aforementioned "steepest" viewing angle. In terms of the 5° to 15° viewing range, the sensitivity of the display should be increased for the 5° to 10° portion, and decreased for the 10° to 15° portion. A virtual image of the light source may be formed as far behind the Fresnel lens as 12 feet in the former range portion by moving the lamp away from the Fresnel, and as close as 6 feet in the latter range portion by moving the lamp toward the Fresnel.

The vertical distance "$a_2$" of light source 48a from Fresnel axis 58 may be computed in the following manner.

The angle "$\gamma$" is created by the observer viewing the image 80 through the optical center line 58 of the Fresnel 52. Thus, $$\sin \gamma = a - a_a/D_{vt}, \text{ where}$$

$a$ = the vertical distance between the stop cue 30a and the virtual image point 80;

$a_1$ = the controlled vertical distance between stop cue 30a and the Fresnel axis 58; and $D_{vt}$ = the distance from the Fresnel lens 52 to the virtual image point 80.

Having computed the sin $\gamma$, the vertical distance "$a_2$" from the Fresnel optical center line 58 to the light source 48a is determined by:

$$a_2 = \sin \gamma \times D_o, \text{ where}$$

$D_o$ = the horizontal distance from light source 48a to the Fresnel lens 52.

It is apparent from the setting-up procedure described hereinbefore that the proper positioning of the stop cues for the various aircraft or vehicles being parked will be a function of the types of the latter, and the specified stopping point. If the mask sections 26 are manufactured with stop cue symbols 30 in fixed relationship to one another, numerous mask sections with different stop cue positions would have to be maintained in order to suit individual requirements. This problem has been eliminated in the present system by providing masks sections 26 with "fixed" stop cues respectively at the top and bottom of the mask section, and one or more intermediate "variable" stop cues, if required. The latter provide a fine adjustment for the system in that the cue may be moved up or down while still remaining adjacent the alpha-numeric designation of the vehicle being parked.

With reference to FIG. 7, after the condition for steepest viewing angle has been established, and the lowest stop cue 30a has been utilized to position lamp 48 with respect to the Fresnel axis 58, the lamp position is maintained fixed, and the intermediate stop cues are each individually moved up or down alongside their associated vehicle designation, in accordance with the required stopping distance from the display. Since the angle "$\gamma$" as well as "$D_{vt}$", "$D_o$" and "$a_2$" are fixed as a result of the initial lamp positioning procedure, the incremental adjustment of an intermediate stop cue provides the proper values of "a" and "$a_1$" to keep the value of the expression for "sin $\gamma$" constant, regardless of the stop cue being considered.

Figure 8:
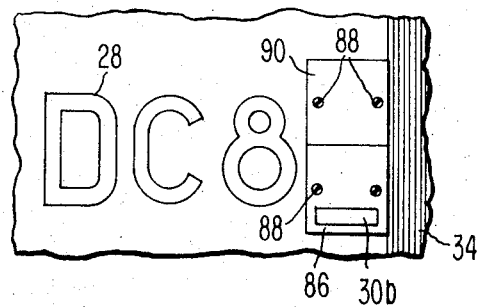
FIG. 8 is a partial view of the mask section of the display illustrating a means of varying the position of a stop cue.

FIG. 8 which is a partial view of one of the alpha-numeric mask sections 26 illustrates a convenient method of varying the position of an "intermediate" stop cue to suit a particular stopping requirement. Thus, the stop cue 30b alongside the DC8 designation is produced by a narrow translucent window in an opaque sectional piece 86 comprised of the same material as the remainder of the mask 26. This piece 86 is fastened to the outside of the mask face by any suitable means, as indicated at points 88.

As illustrated in FIG. 8, the stop cue 30b is below the horizontal center line of the sectional piece 86 and appears adjacent the lower part of the DC8 aircraft designation. Should the specified stopping point require that the stop cue be moved upward, the sectional piece 86 is removed, rotated 180° and again fastened to the mask 26. The translucent stop cue window is now positioned above the horizontal center line of piece 86 and appears just below the center of the DC8 designation.

A completely opaque removable section 90 is shown in FIG. 8 immediately above the piece 86 with its translucent window. If desired the positions of the two sections 86 and 90 may be interchanged and by rotation of section 86 as described hereinabove, two additional positions of the stop cue 30b are made available. One of these positions is just above the center of the DC8 designation; the other, at the upper part of the designation. It should be understood that the foregoing description has been chosen merely for purpose of example, and that the four position adjustment available from the described arrangement may be too coarse a stopping adjustment. Accordingly, in practice more than two removable sectional pieces of proper dimensions may be employed, and the physical location of the translucent window in a section may be varied, thereby making a large number of incremental stop positions available. Such an arrangement would provide the means for fine, accurate adjustments of stopping point distances.

Figure 9:
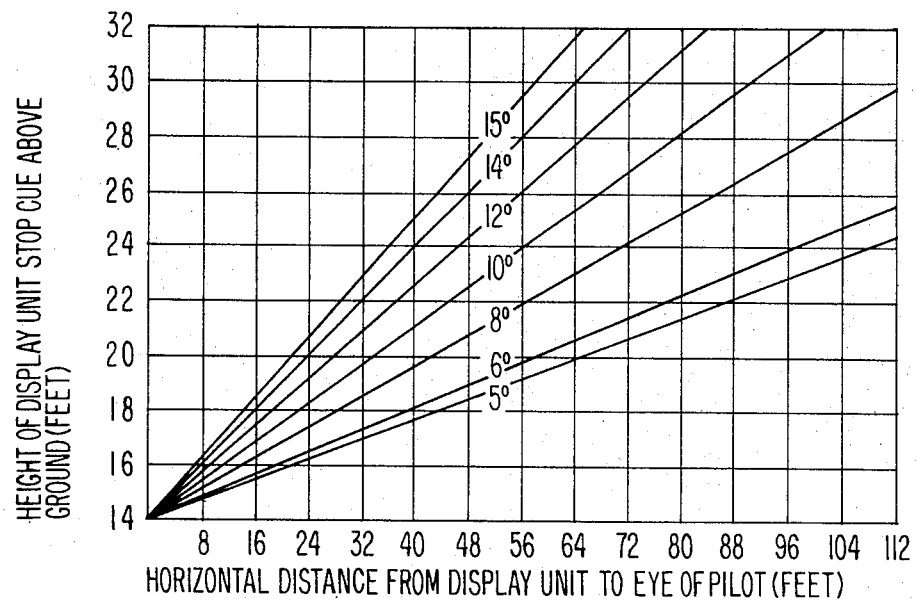
FIG. 9 is a representative chart plotted for a particular type of aircraft and showing the interrelationship among the mounting height of the display device, the viewing angle, and the desired stop point.

FIg. 9 is representative of a series of charts which may be plotted to depict the interrelationship between the height of the display unit stop cue above the ground, and the desired stop point for a particular type of aircraft. FIG. 9 has been plotted for a type 707 aircraft. The proper viewing angle can be derived from the chart by using two known factors, the height of the display unit stop cue above the ground expressed in feet as plotted along the ordinate axis, and the horizontal distance from the display unit to the eye of the pilot in feet along the abscissa. Although the latter distance is commonly designated the "stop point" it should be noted that an additional distance which varies with the type of aircraft must be added thereto for the "nose gear stop point." In the case of the 707 aircraft, this additional distance is 9.25 feet. As an example of the use of the chart, if the stop cue height above the ground is 24 feet and the horizontal distance from the display to the eye of the pilot of the 707 is 56 feet, the viewing angle is approximately 10°.

Figure 10:
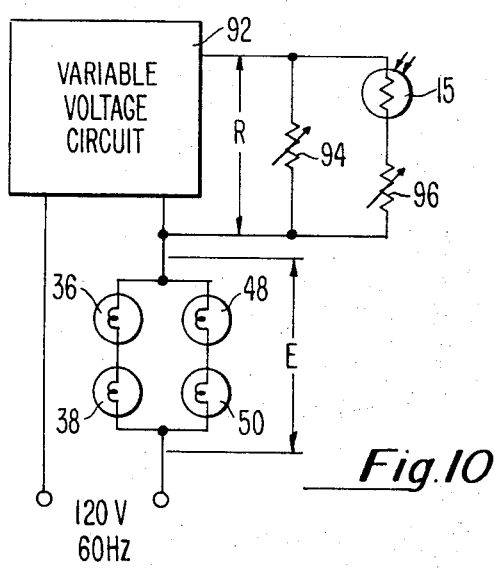
FIG. 10 is an electrical schematic of the automatic light intensity control incorporated in the device of FIG. 2.

FIG. 10 is an electrical schematic of the automatic light intensity control device 76 for the optical docking system of the present invention. The device maintains the optimum contrast ratio between the center line and stop bar module displays and the surrounding ambient light.

The control device comprises a variable voltage circuit 92 such as the General Electric TRIAC Sub-Assembly. The TRIAC is a gate-controlled full wave AC silicon switch designed to switch from a blocking state to a conducting state for either polarity of applied voltage with positive or negative gate triggering. The load circuit is represented by the series/parallel connection of the projection lamps 36, 38 and 48, 50. Each of the lamps is rated 150 watts/120 volts. A pair of potentiometers 94 and 96, each having a resistance value of approximately 250K ohms, are used for "dim" and "-bright" adjustments respectively. A photocell 15 which is mounted above the face of the center line module 14 (FIG. 2) is also provided.

The circuit 92 has the characteristic that its output voltage, E, across the load is inversely proportional to the resistance, R. The voltage E will be 120 volts when R is zero and conversely, when R is approximately 250K ohms, E will be zero.

A resistance circuit comprised of photocell 15 and potentiometers 94 and 96 provides the resistance R. The photocell resistance is inversely proportional to the light striking its surface. In the dark, the photocell resistance is very high, of the order of 100 megohms; in sunlight, its resistance is low, about 20K ohms. The potentiometers 94 and 96 permit adjustment of the circuit 92 output voltage at two points, a dim adjustment and a bright adjustment.

In an actual operating docking system, it is desired to have each of the lamps 36, 38, 48 and 50 operate at 15 to 20 volts in the dark and 40 to 50 volts in sunlight. Output voltages of 30 to 40 volts and 80 to 100 volts respectively, from circuit 92 are required to meet the desired voltage across each lamp. The circuit is adjusted by blocking off the light to the photocell 15, thereby simulating darkness, and then adjusting potentiometer 94 so that 15 to 20 volts is measured across each lamp. Subsequently, a light of approximately 600 foot-candles is directed on the photocell and potentiometer 96 is adjusted for the 40 to 50 volts across each lamp. The actual voltage across each lamp throughout the range between dark and light is a function of the characteristic of the photocell employed in the control circuit. Apart from the feature of providing proper contrast ratio as previously noted, operation of the projection lamps at such relatively low voltage levels, insures long lamp life.

It should be apparent from the foregoing description of the present docking system that a hitherto unavailable device has been provided which: is highly reliable, can be installed with a minimum of structural modification, will perform satisfactorily under widely varying climatic environments, has a long life, and requires minimal maintenance. The configuration of the device described herein represents a highly satisfactory operative embodiment. However, it should be understood that changes and modifications of this configuration may be needed to suit particular requirements. Thus, changes and modifications, insofar as they are not de-

What is claimed is:

1. An optical device for providing visual alignment and guidance to enable an observer to pursue a prescribed path of travel and to stop at a predetermined point along said path comprising,
a center line module having at least first and second light sources and a first lens system positioned with respect to said light sources to form respective images thereof, means within aid center line module for separating the images of said light sources as seen by said observer, said first light source being positioned a first distance from said first lens system whereby the image formed thereof as viewed by said observer appears to remain stationary and serves as a datum bar, said second light source being positioned at a second distance from said first lens system whereby the image formed thereof serves as a center line bar which when viewed by said observer appears to be displaced with respect to said datum bar in proportion to the azimuthal deviation of said observer from said path of travel, the alignment of said center line bar with said datum bar by said observer being indicative of travel along said prescribed path,
a stop bar module having at least a single light source and a second lens system positioned with respect thereto such that the image formed by said second lens system as seen by said observer serves as a stop bar, a stop cue positioned in predetermined relationship to said stop bar module, said stop bar appearing to said observer to be displaced from alignment with said stop cue in proportion to the observer's distance from said predetermined stop point, the concurrent alignments by said observer of said center line bar with said datum bar in said center line module and said stop cue with said stop bar in said stop bar module being indicative of the attainment by said observer of said predetermined stop point along said prescribed path of travel.

2. An optical device as defined in claim 1 wherein said first lens system comprises a first lens so positioned with respect to said center line module first and second light sources that virtual images of said sources are formed, and a second lens positioned with respect to said first lens for diffusing the rays of light emerging from said first lens.

3. An optical device as defined in claim 2 wherein said first lens is a Fresnel lens and said second lens is a cylindrically ribbed lenticular for vertically diffusing said rays of light emerging from said Fresnel lens.

4. An optical device as defined in claim 1 wherein said second lens system comprises a first lens so positioned with respect to said stop bar module light source that a virtual image of said source is formed, and a second lens positioned with respect to said first lens for diffusing the rays of light emerging from said first lens.

5. An optical device as defined in claim 4 wherein said first lens is a Fresnel lens and said second lens is a cylindrically ribbed lenticular for horizontally diffusing said rays of light emerging from said Fresnel lens.

6. An optical device as defined in claim 4 wherein said stop bar module single light source is positioned a predetermined vertical distance off the optical axis of said Fresnel lens and a predetermined horizontal distance therefrom such that when said stop bar is viewed by said observer at a prescribed distance from the front of said device, said stop bar will be aligned with said stop cue.

7. An optical device as defined in claim 6 wherein said stop bar module comprises in addition to said single source, a second light source in said sources being positioned in a vertical plane respectively above and below the optical axis of the Fresnel lens in said second lens system, the stop bar image derived from said first light source being visible exclusively to an observer situated below said optical device, and the stop bar image of said second light source being visible exclusively to an observer situated above said optical device.

8. An optical device as defined in claim 7 further including means for moving said stop bar module light sources along two axes, namely vertically to independently adjust the distance of each of said light sources from the Fresnel lens optical axis and horizontally to collectively adjust the distance of the light sources from the Fresnel lens itself.

9. An optical device for assisting the docking of a vehicle by providing visual information to permit an observer to cause said vehicle to pursue a path of travel along a prescribed center line and to stop at a predetermined point along said line comprising
a center line module having at least first and second light sources and a first lens system positioned with respect to said light sources to form respective images thereof, light baffle means situated within said center line module for separating the images of said light sources as seen by said observer, said first light source being positioned a first distance from said first lens system wherein the image formed thereof as viewed by said observer appears to remain stationary and serves as a vertical datum bar, said second light source being positioned at a second distance from said first lens system whereby the image formed thereof serves as a vertical center line bar, said vertical center line bar when viewed by said observer appearing to move horizontally with respect to said vertical datum marker in response to movement in a horizontal plane on either side of said center line by said observer, the alignment of said center line bar with said datum bar by said observer being indicative of travel along said prescribed center line,
a stop bar module having at least a single light source and a second lens system positioned with respect thereto such that the image formed by said second lens system as seen by said observer serves as a horizontal stop bar,
at least one mask section positioned adjacent said stop bar module and having the designation and associated stop cue of the vehicle being docked, said stop cue being positioned in predetermined relationship to said stop bar module, said horizontal stop bar appearing to said observer to move in a vertical direction in response to adjustment of the distance of said vehicle from said optical device, the concurrent alignments by said observer of said center line bar with said datum bar in said center line module and said stop cue with said stop bar in said stop bar module being indicative of the vehicle having attained said predetermined stop point along said prescribed center line.

10. An optical device as defined in claim 9 wherein said first lens system comprises ground glass inserts illuminated respectively by said center line module first and second light sources and serving as objectives for said first lens system, a Fresnel lens for forming virtual images of said light sources, and a cylindrically ribbed lenticular positioned with respect to said Fresnel lens and having its rib axes oriented horizontally to effect the vertical spreading of the light rays emerging from said Fresnel lens.

11. An optical device as defined in claim 10 further including a pair of narrow, band-like colored filter members positioned respectively at the horizontal extremities of said center line module, between said Fresnel lens and said cylindrically ribbed lenticular, the appearance of said center line bar at a predetermined one of said horizontal extremities as indicated by a change in the normal color of said bar to that of said filter, providing turn-in point information to said observer for insuring initial satisfactory alignment of said vehicle with said prescribed center line.

12. An optical device as defined in claim 11 further characterized in that said ground glass inserts in said first lens system have a spectral wavelength of 5,500 Angstroms.

13. An optical device as defined in claim 9 wherein said second lens system comprises at least one ground glass insert illuminated by said stop bar module light source and serving as the objective for said second lens system, a Fresnel lens for forming a virtual image of said light source, and a cylindrically ribbed lenticular positioned with respect to said Fresnel lens and having its rib axes oriented vertically to effect the horizontal spreading of the light rays emerging from said Fresnel lens.

14. An optical device as defined in claim 13 further characterized in that said ground glass insert in said second lens system has a spectral wavelength of 5,500 Angstroms.

15. An optical device as defined in claim 9 further characterized in that said mask section is of laminar construction comprising the alpha-numeric mask itself having the designations of the vehicles to be docked together with the associated stop cue symbols, said mask being inserted between an external matte-finish acrylic sheet to minimize solar reflections and an internal plastic sheet.

16. An optical device as defined in claim 15 further including means for illuminating said vehicle designations and associated stop cues in said mask section.

17. An optical device as defined in claim 9 further including means for adjusting the vertical position of said stop cue relative to the stop bar module display.

18. An optical device as defined in claim 17 wherein said means for adjusting the vertical position of said stop cue comprises a substantially opaque section having a translucent window therein, said window being displaced a predetermined distance from the horizontal axis of said section and forming said stop cue, means for mounting said section adjacent the designation of the vehicle being docked, respective different stop cue positions being effected by the rotation of said section through 180° at the time of said mounting.

19. An optical device as defined in claim 9 further including an automatic light intensity control circuit for increasing the light intensity of all of said light sources for high ambient light conditions and for decreasing said light intensity for low ambient light, whereby a proper contrast ratio is maintained between said optical device and the surrounding ambient light.

20. An optical device as defined in claim 19 wherein said light intensity control circuit comprises a gate-controlled full wave AC silicon switch having first, second and third terminals, a source of AC voltage having a pair of terminals, means coupling said switch first terminal to one of said pair of AC voltage terminals, the light sources in each of said modules being connected in series strings and the two series strings being connected in parallel with each other, means coupling the light source series/parallel arrangement between the other of said pair of AC voltage terminals and said switch second terminal, first and second potentiometers and a photocell, said first potentiometer being connected in parallel with the series arrangement of said photocell and said second potentiometer, means coupling said last-mentioned series/parallel arrangement between said switch second and third terminals.

* * * * *